US010975535B2

(12) United States Patent
Hogan et al.

(10) Patent No.: US 10,975,535 B2
(45) Date of Patent: Apr. 13, 2021

(54) CONSTRUCTION MACHINE WITH CONTROL SYSTEM CONFIGURED TO CALCULATE VARIOUS OUTPUTS

(71) Applicant: Caterpillar Paving Products Inc., Brooklyn Park, MN (US)

(72) Inventors: Lee M. Hogan, Champlin, MN (US); Jason W. Muir, Andover, MN (US); Timothy M. O'Donnell, Long Lake, MN (US); Ryan A. Enot, Dunlap, IL (US)

(73) Assignee: Caterpillar Paving Products Inc., Brooklyn Park, MN (US)

(*) Notice: Subject to any disclaimer, the term of this patent is extended or adjusted under 35 U.S.C. 154(b) by 0 days.

(21) Appl. No.: 16/399,340

(22) Filed: Apr. 30, 2019

(65) Prior Publication Data
US 2020/0347560 A1 Nov. 5, 2020

(51) Int. Cl.
*E01C 23/088* (2006.01)
*E01C 23/12* (2006.01)

(52) U.S. Cl.
CPC .......... *E01C 23/088* (2013.01); *E01C 23/127* (2013.01)

(58) Field of Classification Search
CPC .............................. E01C 23/088; E01C 23/127
See application file for complete search history.

(56) References Cited

U.S. PATENT DOCUMENTS

| 8,424,972 | B2* | 4/2013 | Berning | E01C 23/088 |
| | | | | 299/1.5 |
| 8,960,806 | B2* | 2/2015 | Wachsmann | E01C 23/088 |
| | | | | 299/1.5 |
| 9,121,146 | B2 | 9/2015 | Paulsen et al. | |
| 9,523,176 | B2* | 12/2016 | Berning | E01C 23/088 |
| 9,605,393 | B2 | 3/2017 | Schlenker et al. | |
| 9,631,329 | B2 | 4/2017 | Fritz et al. | |
| 9,956,842 | B2 | 5/2018 | Muir et al. | |
| 2007/0098494 | A1 | 5/2007 | Mares | |
| 2016/0326701 | A1 | 11/2016 | Schlenker et al. | |
| 2017/0327148 | A1 | 11/2017 | Held et al. | |
| 2017/0362784 | A1* | 12/2017 | Hoffmann | E01C 23/088 |

FOREIGN PATENT DOCUMENTS

CN 105544365 5/2016

\* cited by examiner

*Primary Examiner* — Janine M Kreck
(74) *Attorney, Agent, or Firm* — Schwegman, Lundberg & Woessner (57) ABSTRACT

A machine for road work, the machine can comprise: a frame; a rotor coupled to the frame and configured for rotational movement relative thereto; a milling system actuator configured to raise and lower the rotor to selectively disengage and engage with a surface of a working area; a first position sensor configured to sense a first position of a left side of the rotor relative to the surface; a second position sensor configured to sense a second position of a right side of the rotor relative to the surface; and a controller configured to, in response to signals received from the first position sensor and the second position senor, determine at least a cross-sectional area of the rotor that is engaging the surface.

19 Claims, 6 Drawing Sheets

CONSTRUCTION MACHINE WITH CONTROL SYSTEM CONFIGURED TO CALCULATE VARIOUS OUTPUTS

TECHNICAL FIELD

The present application relates generally, but not by way of limitation, to methods and control systems for construction machines, such as rotary mixer machines and cold planar machines that can be used to remove or recycle paved surfaces. More particularly, the present application relates to control systems for such machines that can compensate for a cross-machine grade in a working area when calculating a cut material volume and other outputs.

BACKGROUND

Rotary mixers can be used to recycle old or degraded pavement for reuse on the surfaces. Cold planer machines can be used to remove old or degraded pavement from surfaces such as roadways and parking lots. The surfaces in such working areas can extend over various terrains including surfaces that have grades (slopes) from the horizontal. As such, these machines can include systems for adjusting the vertical height of the machine and a rotary cutting tool attached thereto in order to, for example, control the cutting depth during milling operations.

Chinese Patent Application No. 105544365, entitled "Milling Machine Watering Amount Control Method And Milling" and U.S. Pat. No. 9,121,146, entitled "Determining Milled Volume or Milled Area of a Milled Surface" disclose construction machines for roadwork that have control systems.

SUMMARY OF THE INVENTION

A machine for road work, the machine can comprise: a frame; a rotor coupled to the frame and configured for rotational movement relative thereto; a milling system actuator configured to raise and lower the rotor to selectively disengage and engage with a surface of a working area; a first position sensor configured to sense a first position of a left side of the rotor relative to the surface; a second position sensor configured to sense a second position of a right side of the rotor relative to the surface; and a controller configured to, in response to signals received from the first position sensor and the second position senor, determine at least a cross-sectional area of the rotor that is engaging the surface.

A method of automatically calculating a production total of a working machine, the method can comprise: setting a scratch position for both a left edge and a right edge of a rotor by activating one or more of a first and a second vertically moveable legs and activating a milling system actuator to engage an entire length the rotor from the left edge to the right edge flush against a surface of a working area; sensing a first position of the left edge of the rotor relative to the surface; sensing a second position of the right edge of the rotor relative to the surface; calculating a deviation of the first position and the second position from the corresponding positions thereof during the scratch position; and determining at least a cross-sectional area of the rotor that is engaging the surface based upon the calculating the deviation.

A system can comprise: a working machine configured to perform roadwork, which can comprise: a frame; a rotor coupled to the frame and configured for rotational movement relative thereto; a milling system actuator configured to raise and lower the rotor to selectively disengage and engage with a surface of a working area; and at least two legs coupled to the frame and configured to be vertically moveable to maintain a desired attitude of the frame and the rotor relative to the surface of the working area. The system can further comprise: a first position sensor configured to sense a first position of a left side of the rotor relative to the surface; and a second position sensor configured to sense a second position of a right side of the rotor relative to the surface.

DETAILED DESCRIPTION

Figure 1:
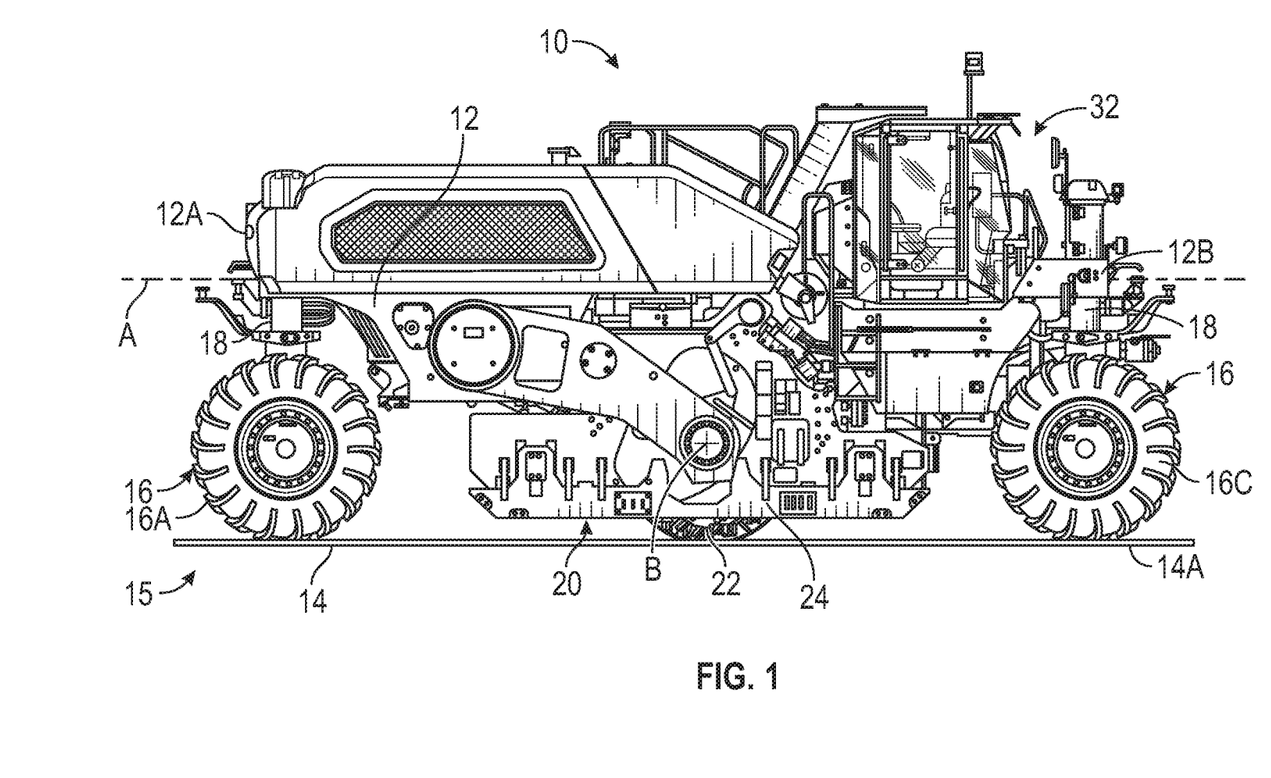
FIG. 1 is a schematic side view of a rotary mixer machine showing a frame, a milling system, a rotor adjustment system and a control system according to an example of the present application.

FIG. 1 is a schematic side view of rotary mixer machine 10 showing frame 12 to which a power source and transportation devices (wheels) can be connected. The transportation devices 16 can be connected to frame 12 via a plurality of legs 18 (also referred to as lifting columns herein). The rotary mixer machine 10 has a milling system 20 that can, for example, be coupled to the underside of frame 12 between transportation devices 16. Although the present application is described with reference to a rotary mixer machine, the present invention is applicable to other types of machines, such as cold planer machines.

The frame 12 can longitudinally extend between front end 12A and rear end 123 along frame axis A. The power source can be provided in any number of different forms including, but not limited to, internal combustion engines, Otto and Diesel cycle internal combustion engines, electric motors, hybrid engines and the like. Power from the power source can be transmitted to various components and systems of machine 10, such as the transportation devices 16, one or more of the plurality of legs 18, the milling system 20 and a controller 100 discussed subsequently.

The frame 12 can be supported by the transportation devices 16 via the legs 18. Although shown as wheels, the transportation devices 16 can be any kind of ground-engaging device that allows rotary mixer machine 10 to move over a surface 14 within a working area 15. Thus, the surface 14 and working area 15 can be, for example, a paved road or a ground already processed by rotary mixer machine 10. Thus, in alternative embodiments, the transportation devices 16 could be configured as track assemblies or crawlers. The transportation devices 16 can be configured to move rotary mixer machine 10 in a forward travel 22 and a backward travel along the ground surface in the direction of axis A. The legs 18 can be vertically moveable (i.e. configured to raise and lower the frame 12) relative to the transportation devices 16 and the surface 14. The legs 18 can be configured to rotate to provide steering for the rotary mixer machine 10.

The rotary mixer machine 10 can have four transportation devices 16 each coupled to a corresponding one of four legs 18. The four transportation devices 16 include: a front left transportation device 16A, a front right transportation device (shown in FIGS. 2 and 3 only) 16B, a rear left transportation device 16C and a rear right transportation device (shown in FIG. 2 only), each of which can be connected to the frame 12 by a corresponding one of legs 18. The present disclosure is not limited to any particular number of propulsion devices, transportation devices or legs. The legs 18 can each comprise actuators such as a hydraulic lifting column configured to raise and lower frame 12 to, for example, set a desired cutting depth of a rotor 22 of the milling system 20 and to accommodate rotary mixer machine 10 engaging obstacles on the ground. However, in some cases the front two legs can operate independent of each other while the rear legs can be tied together with pressure balance and raise and lower together.

As described herein, one or more of the plurality of legs 18 can be coupled to a hydraulic system that can be operated by the controller 100 receiving feedback from a plurality of sensors (e.g., one or more hydraulic pressure sensors, a slope sensor, a plurality of position sensors or combinations thereof, as further discussed subsequently). Further details of a controller 100 and system that can be utilized herewith can be found in application Ser. No. 16/276,270, entitled "CONSTRUCTION MACHINE RIDE CONTROL SYSTEMS AND METHODS USING ELEVATION CYLINDER CONTROL", filed Feb. 14, 2019, the entire contents of which is incorporated by reference in its entirety.

Figure 2:
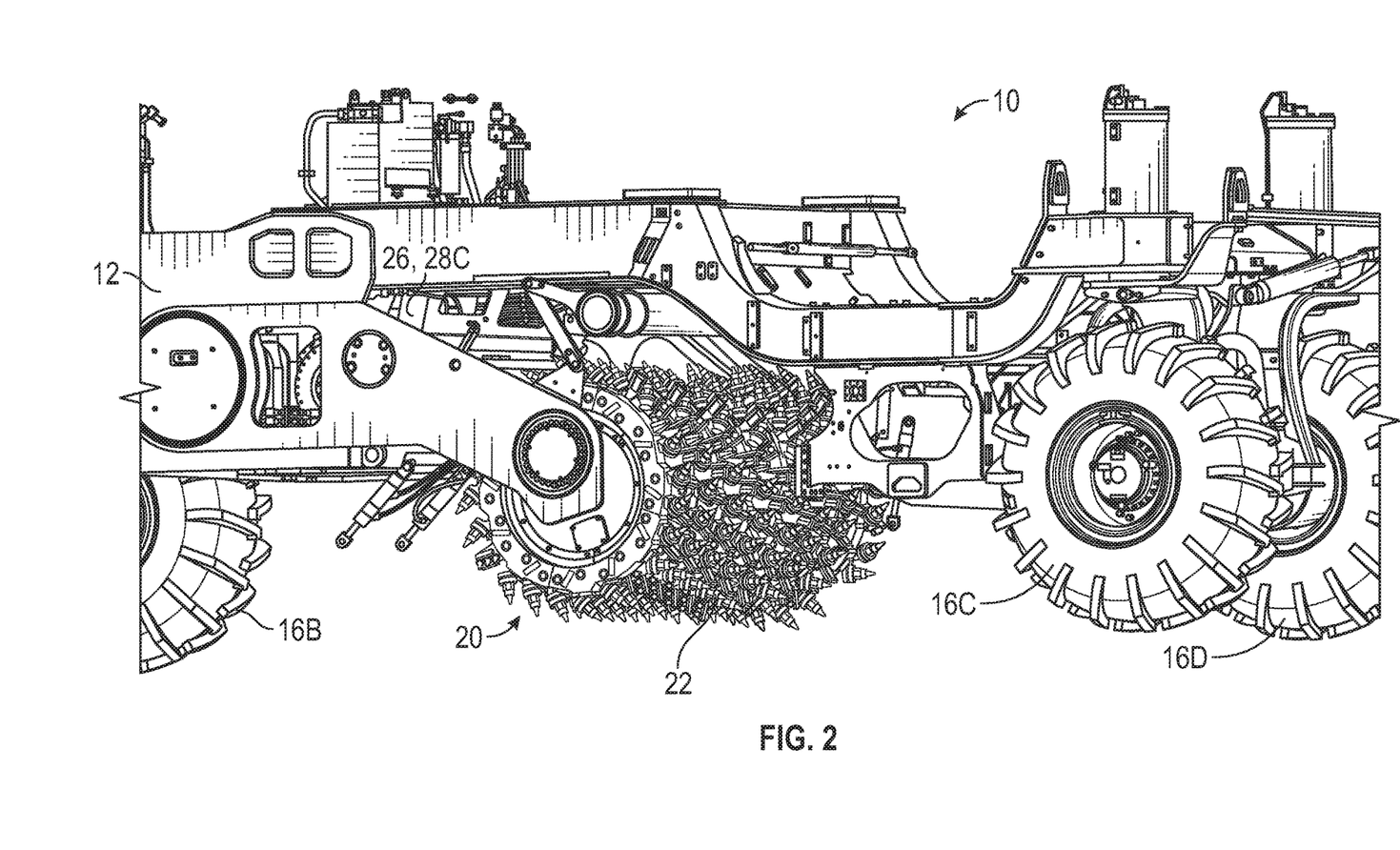
FIG. 2 is a schematic perspective side view of the rotary mixer machine of FIG. 1 further illustrating the milling system according to an example of the present application.

Referring now to FIG. 2 in combination with FIG. 1, the rotary mixer machine 10 (shown in FIG. 2 with the operator cab and propulsion system removed) can include the milling system 20 connected to the frame 12. The milling system 20 can comprise the rotor 22, a housing 24 (not shown in FIG. 2 refer to FIG. 1) and a milling system actuator 26 (FIG. 2 only). The rotor 22 (sometimes called a milling drum or drum) is rotatable relative to the frame 12 and the surface 14 (FIG. 1) and is operatively connected to be driven by the power source. The rotor 22 can include a plurality of cutting tools, such as chisels or bits, disposed thereon. The rotor 22 can be rotated within the housing 24 about axis B extending in a direction perpendicular to frame axis A into the plane of FIG. 1. As rotatable milling drum 22 spins or rotates about axis B, the cutting tools may engage the surface 14, such as, for example, asphalt and concrete, of existing roadways, bridges, parking lots and the like. Moreover, as the cutting tools engage such the surface 14, the cutting tools remove layers of materials forming work surface, such as hardened dirt, rock or pavement. The spinning action of the rotor 22 and the cutting tools pulverizes and mixes an existing road surface (surface 14) and a predetermined amount of the underlying material in a rotor chamber formed by the housing 24 to create a new base or a new road surface. Various additives or aggregates can be deposited on surfaces (including surface 14) or within the working area by the action of the rotor 22 and the cutting tools. Thus, the rotary mixing machine of the present application can include systems for depositing an additive, such as Portland cement, lime, fly ash, cement kiln dust, etc., and/or water on the work surfaces during the mixing/pulverizing operations.

Referring now to FIG. 1, the housing 24 forms the chamber for accommodating the rotor 22 and action of the rotor in pulverizing the surface 14. The housing 24 can include front and rear walls, and a top cover positioned above the rotor 22. Furthermore, the housing 24 can include lateral covers, or side plates (these are removed in FIG. 2), on the left and right sides of the rotor 22 with respect to a travel direction of rotary mixer machine 10. The housing 24 is open toward the ground so that the rotor 22 can engage the ground from within the housing 24.

The milling system 20 can also include the milling system actuator 26 (FIG. 2) that can comprise a hydraulic cylinder or another device configured to raise and lower the rotor to selectively disengage and engage with the surface 14 (FIG. 1) of the working area 15 (FIG. 1).

Figure 3:
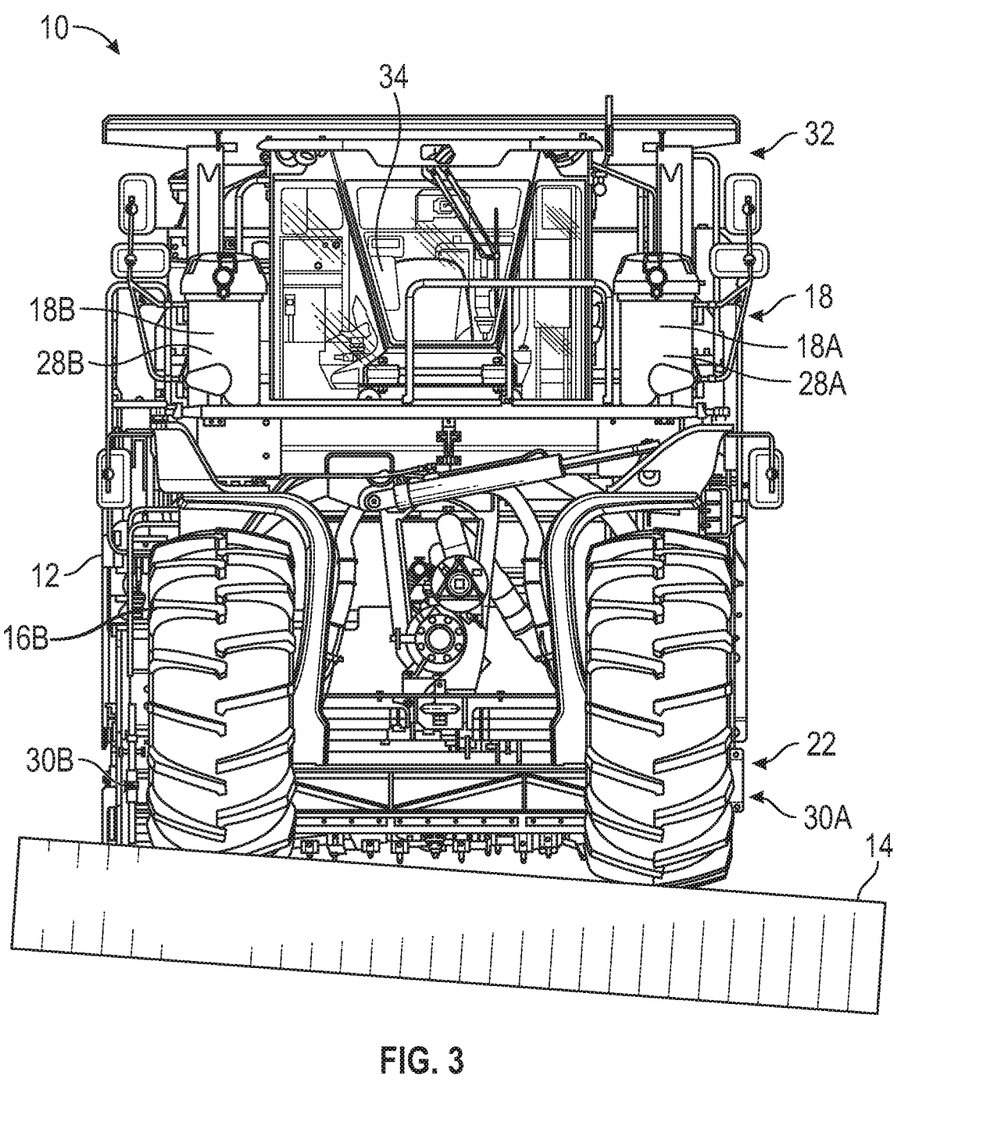
FIG. 3 is a schematic front end view of the rotary mixer machine positioned in a working area that has surface with a cross-slope (cross-grade) relative to a direction of travel of the rotary mixer machine, this cross-slope results in a rotor of the milling system being positioned a varying depth (and having an angle) from the surface along a longitudinal length thereof according to an example of the present application.

According to the embodiment of FIGS. 1-3, and now referring to FIG. 3, the rotary mixing machine 10 can include a first position sensor 28A configured to sense a first position of a left side 30A of the rotor 22 relative to the surface 14 and a second position sensor 28B configured to sense a second position of a right side 30B of the rotor relative to the surface 14. As used herein the term "first position sensor" and the term "second position sensor" can include one or more sensors. Thus, in some examples the first position sensor 28A can have two or more sensors that are part of a system or can just be a single sensor. Similarly, the second position sensor 28B can have two or more sensors that are part of a system or can just be a single sensor. Similarly, any other sensor referenced herein is not limited to a single sensor but can be a system of two or more sensors. The left side 30A can be roughly approximated by the width of the front left transportation device 16A and can include a left edge of the rotor 22. Similarly, the right side 30B can be roughly approximated by the width of the front right transportation device 16B and can include a right edge of the rotor 22. The surface 14 of FIG. 3 is illustrated with a cross-machine slope (grade) from the left side to the right side. Such cross-machine slope was not be accurately accounted for with determinations made by prior methodology of the rotary mixing machines as will be discussed subsequently. Unless the frame 12 and rotor 22 are tilted by the legs 18 to correspond to the cross-machine slope, the rotor 22 is disposed at an angle to the surface 14 as shown in FIG. 3, with the left side 30A being closer to (and indeed being below) the surface 14 than the right side 30B.

According to the embodiment of FIG. 3, at least two of the legs 18 such as a left front leg 18A and a right front leg 18B can include the position sensors 28A and 28B. In some examples, the milling system actuator 26 can include a third position sensor 28C (FIG. 2). In particular, the left front leg 18 can house the position sensor 28A, which can be used to determine a length of left front leg 18A. Similarly, the right front leg 18B can house the second position sensor 28B, which can be used to determine a length of the right front leg 18B. The rear legs 18C, 18D can include positions sensors similar to those of the front legs 18A and 18B. The position of the rear legs 18C, 18D can be sensed and used in a manner similar to the sensed values for the front legs according to some embodiments. From the sensed values, the controller 100 can be configured to: determine the position of the left side 30A and the right side 30B of the rotor, maintain or alter orientation of frame 12 and rotary mixer machine 10 via actuation of the legs 18 either by operator interaction or automatically, perform other determinations as discussed subsequently and provide them as outputs to the operator, etc. For example, the controller 100 can be configured to, in response to signals received from the first position sensor 28A and the second position senor 28B (or other position sensors such as those in the rear leg or rear legs), determine at least a cross-sectional area of the rotor 22 that is engaging the surface 14. The controller 100 can also have other outputs such as a cut material volume, emulsion volume total and/or water volume total as further discussed herein.

As shown in FIGS. 1 and 3, the rotary mixer machine 10 can further include operator station or platform 32 including an interface panel 34 (FIG. 3 only) for inputting commands to the controller 100 (FIG. 6) and control system 102 for controlling rotary mixer machine 10, and for outputting information related to an operation of rotary mixer machine 10. As such, an operator of rotary mixer machine 10 can perform control and monitoring functions of rotary mixer machine 10 from the platform 32, such as by observing various data output from the controller 100 located on rotary mixer machine 10. The interface panel 34 can include results display from sensor(s), output determinations made by controls for various devices and input capability (e.g., for operating transportation devices 16, legs 18, rotor 22, etc.).

The rotary mixer machine 10 can drive over the surface 14 such that the front transportation devices 16 roll over the surface 14. As discussed, the rotary mixer machine 10 can be configured to remove surface 14 from a roadway to leave a planed surface (indicated as 14A in FIG. 1) behind. This planed surface can be substantially horizontal or can have a desired amount of cross-machine slope as desired. In cases where the surface 14 has a cross-machine slope as illustrated in FIG. 3, only portions of the surface 14 that are contacted by the rotor 22 may be engaged and milled to form the planned surface. The rear transportation devices 16 can roll on the planed surface. The milled surface can comprise a surface from which paving material has been completely removed or a surface of paving material from which an upper-most layer of paving material has been removed, or a surface comprising material mixed by the rotor 22, etc.

Figure 4A:
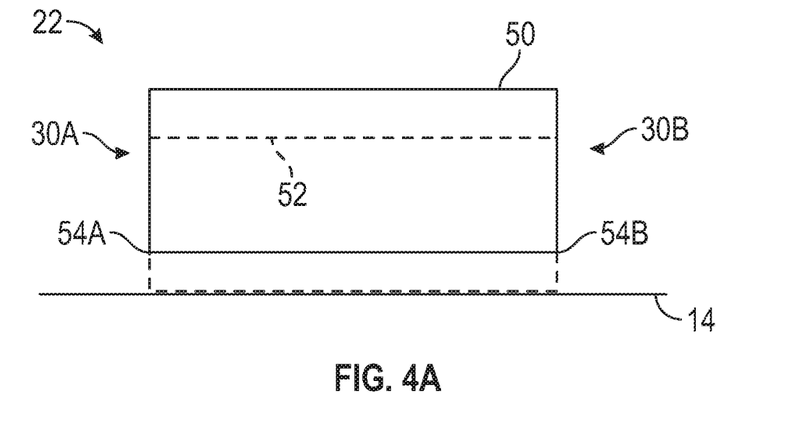
FIG. 4A is a schematic illustration showing the rotor positioned above the rotor scratch position (shown in phantom) so as not in contact with a surface of a first working area.

FIG. 4A shows a highly schematic representation of the rotor 22 positioned in a first position 50 above a rotor scratch position 52 (shown in phantom). The rotor 22 includes the left side portion 30A and the right side portion 30B. The left side portion 30A includes a left edge 54A and the right side portion 30B includes the right edge 54B.

In the first position 50, the rotor 22 is not in contact with the surface 14. In the rotor scratch position 52, an entire length of the rotor 22 from the left edge 54A to the right edge 54B is engaged with the surface 14 so as to be flush against the surface 14. Put another way, the rotor 22 is positioned (via the legs 18 of FIGS. 1-3), the milling system actuator 26 (FIG. 2) and control system to assume a position corresponding that of the surface 14. Such position includes having the rotor 22 positioned at an angle corresponding to the cross-machine slope of the surface 14.

According to the systems and methods later discussed herein, in the first position 50, the left side height of the rotor 22 left side portion 30A (here measured at the left edge 54A from a corresponding portion of the surface 14 vertically below) is greater than 0 and the right side height of the rotor 22 right side portion 30B (here measured at the right edge 54B from a corresponding portion of the surface 14 vertically below) is greater than 0 being above the rotor scratch position 52. As a result, a cross-sectional area of the rotor 22 that is engaging the surface 14 is 0 meaning that no area of the rotor 22 is engaging the surface 14.

Figure 4B:
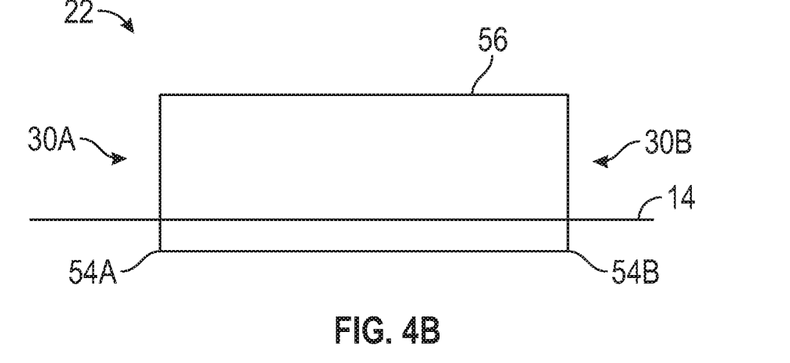
FIG. 4B is a schematic illustration showing the rotor in the first working area moved past the scratch position (shown in phantom in FIG. 4A) to a second position below the scratch position (a milling position shown in solid).

FIG. 4B is a highly schematic illustration of the rotor 22 moved past the rotor scratch position 52 (shown in phantom in FIG. 4A) to a second milling position 56 below the rotor scratch position 52 (FIG. 4A).

In the second milling position 56, both the left side height of the rotor 22 left side portion 30A (here measured at the left edge 54A from a corresponding portion of the surface 14 vertically below) is less than 0 and the right side height of the rotor 22 right side portion 30B (here measured at the right edge 54B from a corresponding portion of the surface 14 vertically below) is less than 0 being below the rotor scratch position 52. As a result, an entire cross-sectional area of the rotor 22 is engaging the surface for calculation purposes. As such equation (1) governs:

$$\text{Cross Section Area (mm}^2) = \frac{|L_{Dept}| + |R_{Dept}|}{2} * \text{Rotor}_{Widt}$$

In equation 1, the $L_{dept}$ is the depth at the left side portion 30A below the corresponding depth of the left side portion 30A in the rotor scratch position 52, $R_{dept}$ the depth at the right side portion 30B below the corresponding depth of the right side portion 30A in the rotor scratch position 52 and $\text{Rotor}_{Width}$ is the rotor width as measured from the left edge 54A to the right edge 54B. Thus, in the second position 56, the cross-sectional area of the rotor 22 engaging the surface is the depth of the rotor 22 below the surface 14 multiplied by the width of the rotor 22.

Figure 4C:
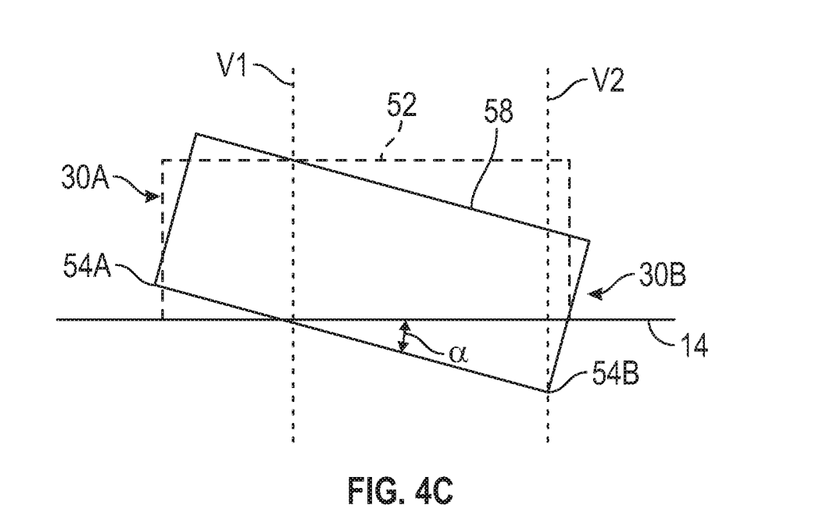
FIG. 4C is a schematic illustration showing the rotor moved from the scratch position of the first working area (the rotor and surface of the first working area now shown in phantom in FIG. 4C) to a second working area with a surface (not shown) having a cross-machine grade that repositions the rotor in an altered position with respect to the scratch position.

FIG. 4C is a highly schematic illustration of the rotor 22 moved from the rotor scratch position 52 (the rotor 22 and the surface 14 of the rotor scratch position 52 are shown in phantom in FIG. 4C) to a second working area with another surface (not shown) having a cross-machine grade that differs from that of the surface 14. This different surface slope with the cross-machine grade (or different positioning of the legs and milling system actuator) repositions the rotor 22 in an altered third milling position 58 with respect to the rotor scratch position 52 as illustrated in FIG. 4C.

In the third milling position 58, the left side height of the rotor 22 left side portion 30A (here measured at the left edge 54A from a corresponding portion of the surface 14 vertically below) is greater than 0 (above a corresponding position in the rotor scratch position 52) but the right side height of the rotor 22 right side portion 30B (here measured at the right edge 54B from a corresponding portion of the surface 14 vertically below) is less than 0 having a position below a corresponding position in the rotor scratch position 52. As a result, a portion of the cross-sectional area of the rotor 22 is engaging the surface (not shown) for calculation purposes. As such equation (2) governs:

$$\text{Cross Section Area (mm}^2) = \frac{1}{2} * \frac{[\text{MIN}(L_{Dept}, R_{Dept})]^2}{|L_{Dept}| + |R_{Dept}|} * \text{Rotor}_{Widt}$$

Equation 2 would also govern in a scenario where the left side portion 30A was below a corresponding position in the rotor scratch position but the right side portion 30B was above the corresponding position in the rotor scratch position. In equation 2, the $L_{dept}$ is the depth at the left side portion 30A above, below or at the corresponding depth of the left side portion 30A in the rotor scratch position 52, $R_{dept}$ the depth at the right side portion 30B above, below or at the corresponding depth of the right side portion 30A in the rotor scratch position 52 and Rotor$_{Width}$ is the rotor width as measured from the left edge 54A to the right edge 54B. Thus, in the third milling position 56, the cross-sectional area of the rotor 22 engaging the surface (not shown) can have a triangle shape in cross-section below the surface 14 as indicated by vertical lines V1 and V2 and having an angle α between the surface 14 and the rotor 22.

Figure 5:
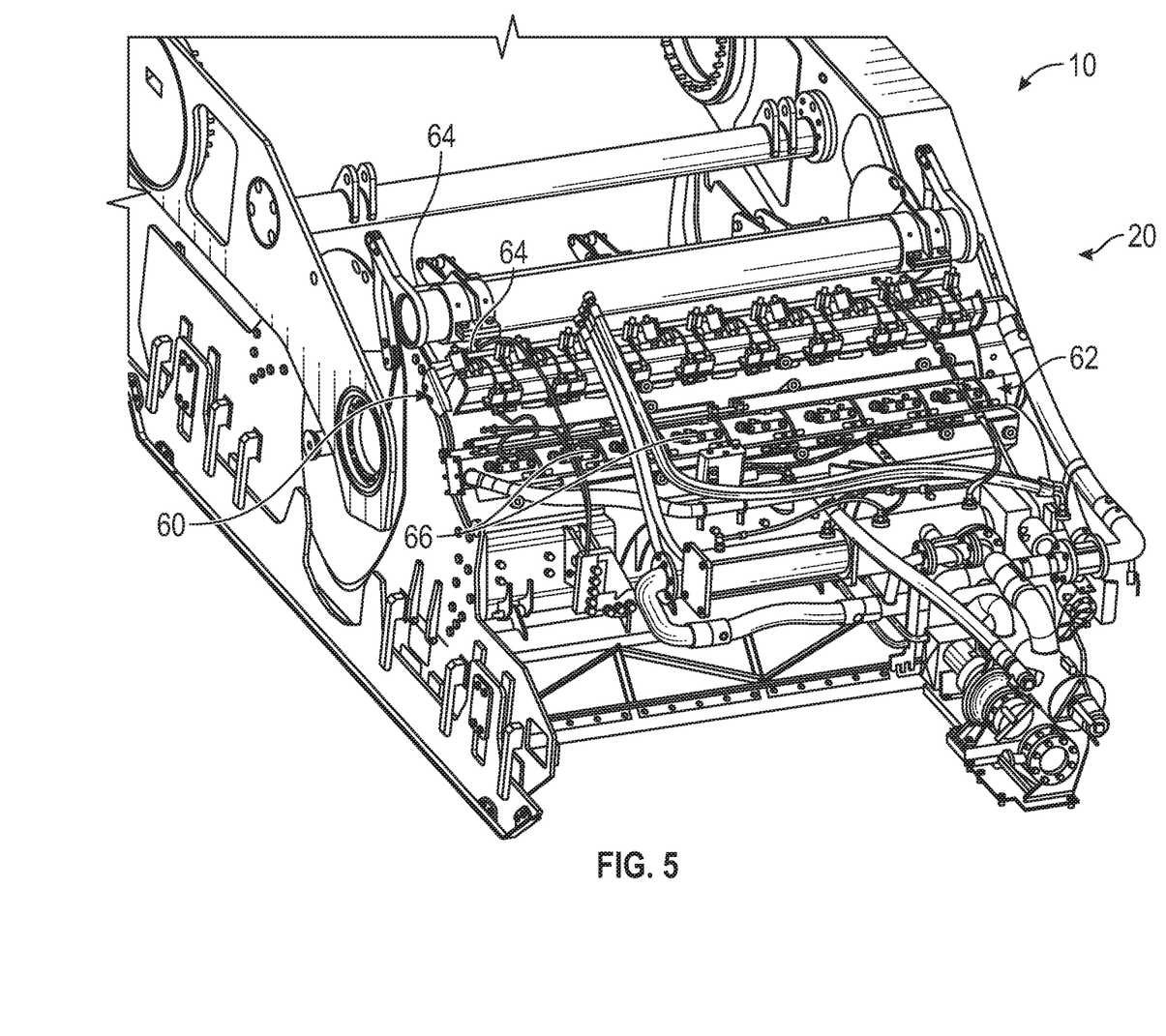
FIG. 5 is a schematic perspective view of a portion of the milling system of the rotary mixer machine of FIG. 1 showing both a water spray system and an emulsion spray system according to an example of the present application.

FIG. 5 illustrates another aspect of the rotary mixer machine 10 and shows the milling system 20. Other portions of the rotary mixer machine 10 such as the frame and rotor are not illustrated in FIG. 5. FIG. 5 shows the milling system 20 can include a water spray system 60 and an emulsion spray system 62. In some embodiments, the rotary mixer machine 10 can have one of the water spray system 60 or the emulsion spray system 62 but not the other. In yet further embodiments, the rotary mixer machine 10 may not be equipped with either system.

As shown in FIG. 5, the water spray system 60 has a plurality of nozzles arrayed along a cross-machine length of the housing 24. Each of these nozzles is configured to spray into a different area along the cross-machine length of the housing 24. Put another way, the water spray system 60 has a plurality of water spray zones 64 within the housing 24. These zones 64 can be operated independently of one another, such that some of the nozzles may be operational while others are not. Thus, not all the zones 64 need be operational at one time. For example, in some cases as operational criteria dictate, only half the zones 64 may be operational at one time. Similarly, the emulsion spray system 62 has a plurality of nozzles arrayed along a cross-machine length of the housing 24. Each of these nozzles is configured to spray into a different area along the cross-machine length of the housing 24. Thus, the water spray system 60 has a plurality of emulsion spray zones 66 within the housing 24. These zones 66 can be operated independently of one another, such that some of the nozzles may be operational while others are not. Thus, not all the zones 66 need be operational at one time.

For calculation purposes, a water total volume (calculated by the control system 102, for example) can accrue only when the water spray system 60 is on (nozzles spraying) and can be captured by the equation (3):

Machine Water Spraying Volume Mixed=Machine Water Spraying Distance Traveled (Meter)*Rotor Cross Sectional Area The "Rotor Cross Sectional Area" is the value determined by the control system with respect to FIGS. 4A-4C of the present application. However, it is important to note that the "Rotor Cross Sectional Area" can also be altered by a factor that corresponds to the number of zones 64 in operation out of the total number of zones 64. Thus, if only half of the zones 64 are in operation the "Rotor Cross Sectional Area" would be reduced by half. The control system can also monitor and calculate the distance traveled by the rotary mixer machine 10 with the water spray system on to determine the "Machine Water Spraying Distance Traveled". This output can be provided to a display interface to the operator and can be otherwise tabulated such as for reporting purposes.

For calculation purposes, an emulsion total volume (calculated by the control system 102, for example) can accrue only when the emulsion spray system 62 is on (nozzles spraying) and can be captured by the equation (4):

Machine Emulsion Spraying Volume Mixed=Machine Emulsion Spraying Distance Traveled (Meter)*Rotor Cross Sectional Area As with the water spray system 60, for the equation (4) the "Rotor Cross Sectional Area" is the value determined by the control system with respect to FIGS. 4A-4C of the present application. However, it is important to note that the "Rotor Cross Sectional Area" can also be altered by a factor that corresponds to the number of zones 66 in operation out of the total number of zones 66. Thus, if only half of the zones 66 are in operation the "Rotor Cross Sectional Area" would be reduced by half. The control system can also monitor and calculate the distance traveled by the rotary mixer machine 10 with the water spray system on to determine the "Machine Water Spraying Distance Traveled". This output can be provided to a display interface to the operator and can be otherwise tabulated such as for reporting purposes. Thus, the controller (or control system) can be configured to determine at least one of the emulsion volume total or the water volume total based upon the cross-sectional area of the rotor that is engaging the surface, a forward distance the machine travels in the working area and an operable number of the plurality of zones of the at least one of the water spray system 60 or the emulsion spray system 62.

Figure 6:
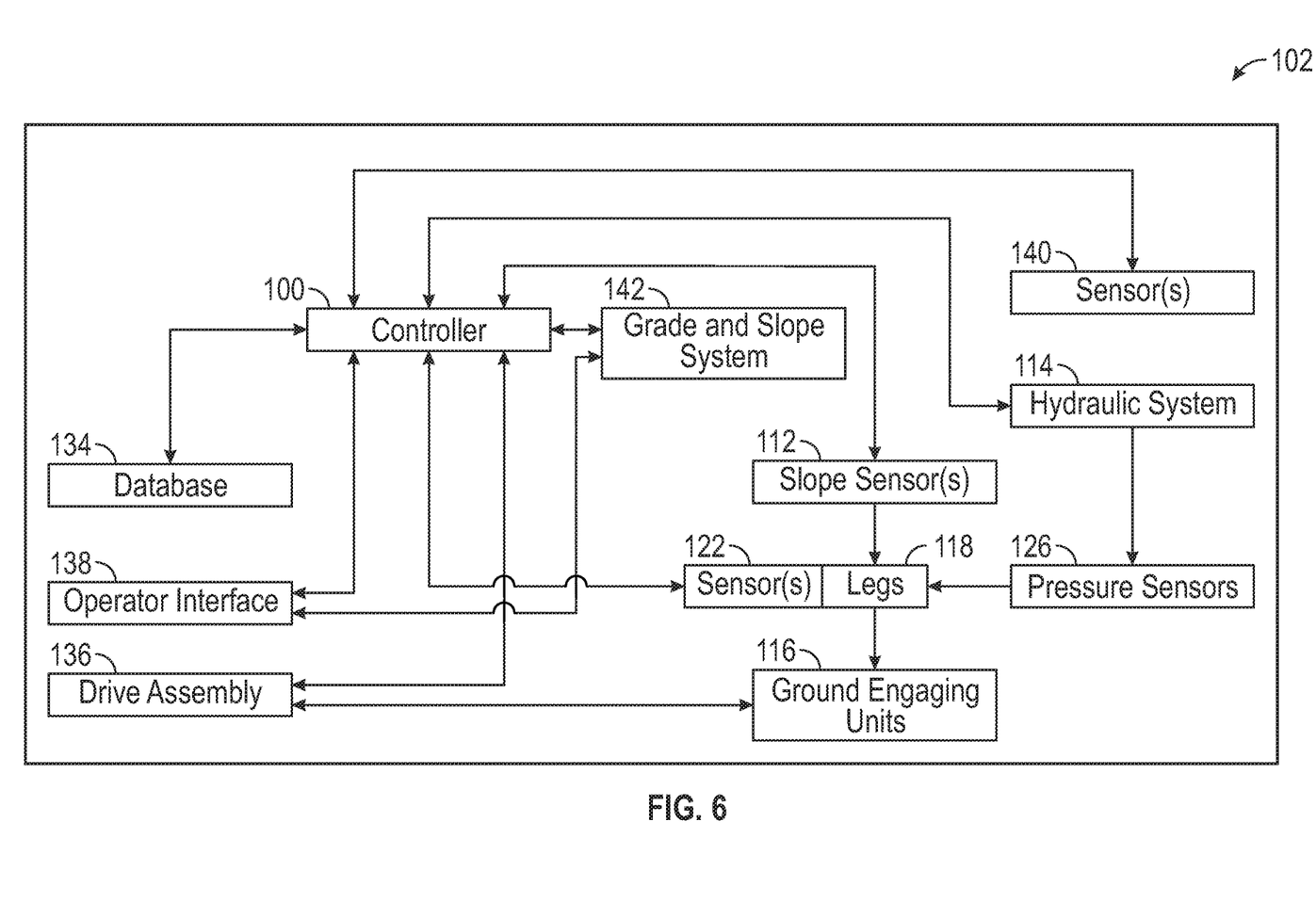
FIG. 6 is a schematic diagram of a control system for the rotary mixer machine according to an example of the present application.

FIG. 6 is an illustration of a control system 102 for rotary mixer machine 10. Control of the rotary mixer machine 10 can be managed by one or more embedded or integrated controllers 100 of the rotary mixer machine 10 that can be part of the control system 102. The controller 100 can comprise one or more processors, microprocessors, microcontrollers, electronic control modules (ECMs), electronic control units (ECUs), or any other suitable means for electronically controlling functionality of the rotary mixer machine 10.

The controller 100 can be configured to operate according to a predetermined algorithm or set of instructions for controlling the rotary mixer machine 10 based on various operating conditions of the rotary mixer machine 10 based on, for example, input from various sensors (e.g., pressure sensor(s) 126, position sensors 122 and a slope sensor 112).

It is further contemplated that the controller 100 can be configured to continuously perform various calculations such as those of equations (1)-(4) in a dynamic manner in real-time and output these to an interface (such as the interface panel 34 of FIG. 3). The controller 100 can also be configured to perform the various calculations for discrete periods of predefined time and can output these to the interface or to another remote computer or device in the form of a report, for example.

Such algorithms or set of instructions can be stored in a database 134 and can be read into an on-board memory of the controller 100, or preprogrammed onto a storage medium or memory accessible by the controller 100, for example, in the form of a hard drive, jump drive, optical medium, random access memory (RAM), read-only memory (ROM), or any other suitable computer readable storage medium commonly used in the art (each referred to as a "database").

The controller 100 can be in electrical communication or connected to a drive assembly 136, or the like, and various other components, systems or sub-systems of rotary mixer machine 10. The drive assembly 136 can comprise an engine or hydraulic motor among other elements (such as power source discussed in FIG. 1). By way of such connection, the controller 100 can receive data pertaining to the current operating parameters of the rotary mixer machine 10 from sensors, such as the pressure sensor(s) 126, the slope sensor 112 and the position sensors 122, and the like, in response to such input, the controller 100 may perform various determinations and transmit output signals corresponding to the results of such determinations or corresponding to actions that need to be performed, such as for producing forward and rearward movement using ground engaging units (such as transportation devices 16 of FIG. 1) or producing up and down movements of the legs 18 as desired. Thus, the controller 100 can be configured to activate at one of the first and second vertically moveable legs to maintain a desired attitude of the frame and the rotor relative to the surface of the working area, for example.

As is further discussed herein, the controller 100 (automatically or at the instruction of the operator) can be configured to activate at least one of the first and second vertically moveable legs and activate the milling system actuator to engage an entire length the rotor from a left edge to a right edge thereof flush against the surface of the working area (i.e. thereby obtaining the rotor scratch position 52 discussed in FIGS. 4A-4C). As was discussed in FIGS. 4A-4C, the controller 100 can be configured to reference the positions of the first and second vertically moveable legs and the position of the milling system actuator that engages the entire length of the rotor flush against the surface in determining the cross-sectional area of the rotor that is engaging the surface. Such determination by the controller 100 can occur when the first position of the left side of the rotor or the second position of the right side of the rotor are sensed to be at or below corresponding positions measured when the entire length of the rotor is flush against the surface.

Furthermore, according to one embodiment the control system 102 via the controller 100 can be configured to automatically determine various totals of a rotary mixing job using a number of sensed inputs, such as (water or emulsion or both) spray rate, calculated distance traveled, left-side rotor depth, and right-side rotor depth. The control system 102 via the controller 100 can be configured to automatically determine and report performance information, including a cross-sectional area of the rotor that is engaging the surface (continuously—refer to discussion in reference to FIGS. 4A-4C), a cut volume mixed (determined from the cross-sectional area of the rotor that is engaging the surface and a forward distance the machine travels in the working area), a water or emulsion volume sprayed (reference FIG. 5), a spray rate relative to volume mixed, while accounting for the rotor having a cross-machine slope as discussed herein.

The controller 100, including operator interface 138, can include various output devices, such as screens, video displays, monitors and the like that can be used to display information, warnings, data, such as text, numbers, graphics, icons and the like, regarding the status of the machine 10. The controller 100, including operator interface 138, can additionally include a plurality of input interfaces for receiving information and command signals from various switches and sensors associated with the rotary mixer machine 10 and a plurality of output interfaces for sending control signals to various actuators associated with the rotary mixer machine 10. Suitably programmed, the controller 100 can serve many additional similar or wholly disparate functions as is well-known in the art.

With regard to input, the controller 100 can receive signals or data from the operator interface 138, pressure sensors 126, position sensors 122, sideplate sensors 140, and the like. The controller 100 can also receive position and/or length data from each position sensor 122. As noted before, such data may include, but is not limited to, information as to the lengths of the legs 18 or the amount of extension or retraction of the leg 18. The controller 100 can also receive data from sensor(s) 140 that can be part of the milling system actuator 26, for example. Such data may include, but is not limited to, information related to the vertical position of rotor 22 and/or whether rotor 22 is in contact with surface 14 (refer to FIGS. 1-3).

The controller 100 can also receive data from other controllers, grade and slope system 142 for rotary mixer machine 10, operator interface 138, and the like. In examples, another controller may provide information to the controller 100 regarding the operational status of rotary mixer machine 10. In other examples, such information may be provided by grade and slope system 142, or the like, to the controller 100. The operation status received may include whether rotary mixer machine 10 is in non-milling operational status or milling operational status (e.g., rotor 22 is not spinning or spinning), if the spray or emulsion systems are operational (spraying), etc.

In examples, the grade and slope system 142 may receive and process data from the operator interface 138 or automatically from the controller 100 related to the desired depth of the cut, the slope of the cut, and the like. The grade and slope system 142 can include the one or more slope sensors 112, which can detect rotation along longitudinal axis and transverse axis of the frame 12 and/or rotor 22.

The controller 100 can receive data from each leg position sensor 122. As noted before, such data may include information as to the length L of the leg 18 or the amount of extension or retraction of the leg 18, for example. The controller 100 can also receive data from the one or more sensors 140 that can be part of the milling system 20. Such data may include information related to the vertical position of the rotor 22 and/or whether rotor 22 is in contact with surface is in contact with the surface 14 (reference FIG. 1).

The controller 100 can also receive data from the grade and slope system 142, such as from the slope sensor 112, or the operator interface 138 as to the operational status of the machine. Operational status received can include whether rotary mixer machine 10 is in milling operational status, whether the water or spray systems are operational, various outputs determined by the controller 100 derived from sensed data as described previously, information as to the grade (the depth of the cut) and the slope of the cut, etc.

The controller 100 can receive data from the pressure sensors 126. Pressure sensors 126 can be used to determine a status of legs 18. For example, information from the pressure sensors 126 can be used determine the magnitude of impacts and on transportation devices 16 or the magnitude of depressions over which transportation devices 16 traverse. Additionally, for example, information from the pressure sensors 126 can also be used to determine the position of leas 18, e.g., the position of a piston relative to a cylinder housing. As such, information from pressure sensors 126 can be used to take corrective action or other control actions for the rotary mixer machine 10. For example, the controller 100 can be employed to react to readings from pressure sensors 126 and adjust the orientation of frame 12, such as by changing the position of one or more legs 18, or an operator of rotary mixer machine 10 can observer visual, audible or other warning information or indicia on operator interface 138 to manually adjust the position of legs 18.

INDUSTRIAL APPLICABILITY

The present application describes various apparatuses, systems and methods for a rotary mixer machine 10 or cold planer machine. These can include a controller or method of controlling that determines various operational criteria derived from sensed data either in real-time or as running totals for a desired period of time. This sensed data can be (water or emulsion or both) spray rate, calculated distance traveled, left-side rotor depth, and right-side rotor depth. The control system 102 via the controller 100 can be configured to automatically determine and report performance information, including a cross-sectional area of the rotor that is engaging the surface (continuously or over a desired period of time refer to discussion in reference to FIGS. 4A-4C), a cut volume mixed (determined from the cross-sectional area of the rotor that is engaging the surface and a forward distance the machine travels in the working area), a water or emulsion volume sprayed (reference FIG. 5), a spray rate relative to volume mixed, while accounting for the rotor having a cross-machine slope.

As conventionally, the operator or job foreman needs to manually calculate totals for a given amount of time such as distance traveled while cutting, area covered while cutting, volume mixed while cutting and water and/or emulsion volume sprayed to meet project specs/goals, the present apparatuses, systems and methods with automatic determinations of such operational outputs by controller can save time, improve accuracy and reduce cost.

For example, techniques disclosed herein such as of being able to automatically with the controller determine left-side rotor depth and right-side rotor depth in a working area with a cross-machine slope is of particular relevance to improving accuracy of determinations such as the cross-sectional area of the rotor that is engaging the surface, the cut volume mixed, the water and/or emulsion volume sprayed, etc. with respect to the conventional methodology of manual calculation.

What is claimed is:

1. A machine for road work, the machine comprising:
a frame;
a rotor coupled to the frame and configured for rotational movement relative thereto;
a milling system actuator configured to raise and lower the rotor to selectively disengage and engage with a surface of a working area;
a first position sensor positioned within a left leg and configured to sense a position of the left leg relative to the surface, wherein the left leg is arranged relative to the rotor to approximate a first position of a left side of the rotor relative to the surface;
a second position sensor positioned within a right leg and configured to sense a position of the right leg relative to the surface, wherein the right leg is arranged relative to the rotor to approximate a second position of a right side of the rotor relative to the surface; and
a controller configured to, in response to signals received from the first position sensor and the second position senor, determine at least a cross-sectional area of the rotor that is engaging the surface.

2. The machine for road work of claim 1, wherein the controller is configured to determine a cut material volume from the cross-sectional area of the rotor that is engaging the surface and a forward distance the machine travels in the working area.

3. The machine for road work of claim 1, further comprising at least one of a water spray system having a plurality of zones or an emulsion spray system having a plurality of zones, and wherein the controller is configured to determine at least one of an emulsion volume total or a water volume total based upon the cross-sectional area of the rotor that is engaging the surface, a forward distance the machine travels in the working area and an operable number of the plurality of zones of the at least one of the water spray system or the emulsion spray system.

4. The machine for road work of claim 1, wherein the first position sensor is positioned in a first vertically moveable leg of the frame and the second position sensor is positioned in an opposing second vertically moveable leg of the frame.

5. The machine for road work of claim 4, wherein the controller is configured to activate at one of the first and second vertically moveable legs to maintain a desired attitude of the frame and the rotor relative to the surface of the working area.

6. The machine for road work of claim 4, wherein the controller is configured to activate at least one of the first and second vertically moveable legs and activate the milling system actuator to engage an entire length the rotor from a left edge to a right edge thereof flush against the surface of the working area.

7. The machine for road work of claim 6, wherein the controller is configured to reference the positions of the first and second vertically moveable legs and the position of the milling system actuator that engages the entire length of the rotor flush against the surface in determining the cross-sectional area of the rotor that is engaging the surface.

8. The machine for road work of claim 7, wherein the determining the cross-sectional area of the rotor that is engaging the surface by the controller occurs when the first position of the left side of the rotor or the second position of the right side of the rotor are sensed to be at or below corresponding positions measured when the entire length of the rotor is flush against the surface.

9. The machine for road work of claim 1, further comprising a third sensor that is part of the milling system actuator, wherein the third sensor is configured to sense an engagement of the rotor with the surface, and wherein the first position of the left side of the rotor comprises a left edge of the rotor and the second position of the right side of the rotor comprises a right edge of the rotor.

10. A method of automatically calculating a production total of a working machine, the method comprising:
setting a scratch position for both a left edge and a right edge of a rotor by activating one or more of a first and a second vertically moveable legs and activating a milling system actuator to engage an entire length the rotor from the left edge to the right edge flush against a surface of a working area;
sensing a first position of the left edge of the rotor relative to the surface with a first position sensor positioned at a left leg of the working machine, wherein the first position sensor is configured to sense a position of the left leg relative to the surface, and wherein the left leg is arranged relative to the rotor to approximate a first position of a left edge of the rotor relative to the surface;

sensing a second position of the right edge of the rotor relative to the surface with a second position sensor positioned at a right leg of the working machine, wherein the second position sensor is configured to sense a position of the right leg relative to the surface, and wherein the right leg is arranged relative to the rotor to approximate a second position of a right edge of the rotor relative to the surface;

calculating a deviation of the first position and the second position from the corresponding positions thereof during the scratch position; and determining at least a cross-sectional area of the rotor that is engaging the surface based upon the calculating the deviation.

11. The method of claim 10, further comprising determining a cut material volume from the cross-sectional area of the rotor that is engaging the surface and a forward distance the machine travels in the working area.

12. The method of claim 10; further comprising determining at least one of an emulsion volume total or a water volume total based upon the cross-sectional area of the rotor that is in contact with the surface, a forward distance the machine travels in the working area and an operable number of a plurality of zones of the at least one of a water spray system or an emulsion spray system.

13. The method of claim 10, wherein the determining at least the cross-sectional area of the rotor that is engaging the surface based upon the calculating the deviation occurs in real-time, is repeatedly performed as the working machine moves with the working area and occurs when the sensed first position or sensed second position is at or below the corresponding positions thereof during the scratch position.

14. The method of claim 10, wherein the first position sensor is positioned in a first vertically moveable leg of the frame and the second position sensor is positioned in an opposing second vertically moveable leg of the frame.

15. A system comprising:
a working machine configured to perform roadwork, comprising:
a frame;
a rotor coupled to the frame and configured for rotational movement relative thereto;
a milling system actuator configured to raise and lower the rotor to selectively disengage and engage with a surface of a working area; and
at least two legs coupled to the frame and configured to be vertically moveable to maintain a desired attitude of the frame and the rotor relative to the surface of the working area; and
a first position sensor positioned within a left leg of the at least two legs and configured to sense a position of the left leg relative to the surface, wherein the left leg is arranged relative to the rotor to approximate a first position of a left side of the rotor relative to the surface;
a second position sensor positioned within a right leg of the at least two legs and configured to sense a position of the right leg relative to the surface, wherein the right leg is arranged relative to the rotor to approximate a second position of a right side of the rotor relative to the surface; and
a controller, which, in response to signals received from the first position sensor and the second position sensor, determines at least one of a cross-sectional area of the rotor that is engaging the surface, a cut material volume, an emulsion volume total or a water volume total.

16. The system of claim 15, wherein the controller is configured to activate at least one of the first and second vertically moveable legs and activate the milling system actuator to engage an entire length the rotor from a left edge to a right edge thereof flush against the surface of the working area.

17. The system of claim 16, wherein the controller is configured to reference the positions of the first and second vertically moveable legs and the position of the milling system actuator that engages the entire length of the rotor flush against the surface in determining the cross-sectional area of the rotor that is engaging the surface.

18. The system of claim 17, wherein the determining the cross-sectional area of the rotor that is engaging the surface by the control system occurs when the first position of the left side of the rotor or the second position of the right side of the rotor are sensed to be at or below corresponding positions measured when the entire length of the rotor is flush against the surface.

19. The system of claim 15, further comprising a third sensor that is part of the milling system actuator, wherein the third sensor is configured to sense an engagement of the rotor with the surface, and wherein the first position of the left side of the rotor comprises a left edge of the rotor and the second position of the right side of the rotor comprises a right edge of the rotor.

* * * * *